Feb. 2, 1965  B. S. LYNN  3,168,019
JET AIRCRAFT RUNWAY HAVING ANTI-SKID PROPERTIES WHEN WET
Filed Nov. 16, 1961
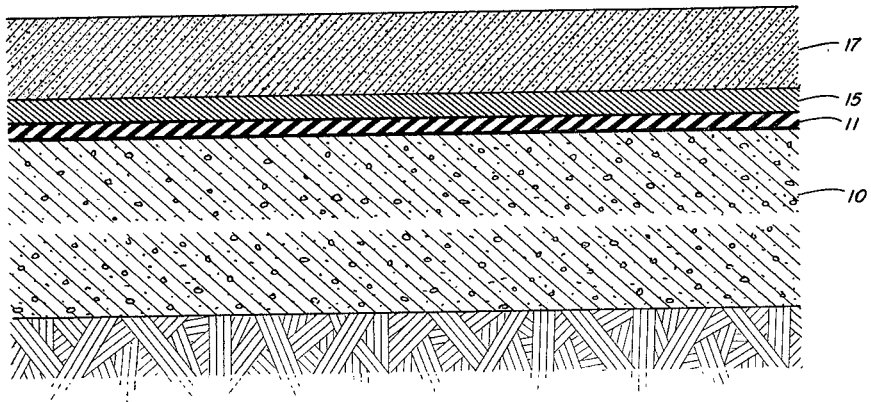
Inventor:
Bernard Stanley Lynn
By Henry H Snelling
his Attorney 3,168,019
JET AIRCRAFT RUNWAY HAVING ANTI-SKID
PROPERTIES WHEN WET
Bernard Stanley Lynn, 19451 Black Road,
Los Gatos, Calif.
Filed Nov. 16, 1961, Ser. No. 152,732
6 Claims. (Cl. 94—5)

This invention relates to runways for jet aircraft and has for its principal object the provision of a coated runway which greatly increases the rate of deceleration of heavy jet airplanes without increasing tire wear, in fact actually increasing their length of usefulness.

An additional object of the invention is the provision of a method of applying a coating to an existing runway in such a manner as to minimize the danger of skidding during wet weather and incidentally to provide a thixotropic coating to be applied over an adhesive consisting of or containing as one element, xylene or a similar hydrocarbon solvent.

A further object of the invention is to provide an anti-skid compound suitable for application to a runway used by heavy jet aircraft to provide safety features during wet weather as the aircraft impact forms a thin powdery film at the contact surface, such film consisting of very finely divided solid abrasive constituents of the anti-skid compound which are impressed back into the surface of the compound by the great pressure exerted by rolling vehicles.

As is well known the landing speed must be greater than that at which the plane will stall, that is such landing speed is appreciably over the critical or stalling speed, so under normal conditions runways used in landing heavy jet aircraft such as the military bombers are soon covered with a substantial coating of adherent vulcanized rubber which has been removed from the tires by the landing impact; particularly in the touch-down areas.

This rubber coating, while giving little trouble in dry weather is dangerous during rain or fog. A film of water is formed over the rubber coating of the runway and hence friction is reduced to a dangerous low point at which time skidding may and frequently does occur. Under conditions just mentioned it is very difficult to stop the aircraft as well as to steer it and consequently there is an appreciable hazard of overrunning the runway unless the latter is especially long.

The runway of this invention provides a surface of high frictional value when wet but has little affinity for rubber even at the time the tires first strike the runway they then being motionless about their axles, although the plane is moving at high speed. Tests indicate that the deceleration obtained with a runway as specified herein is a full three times as great in feet per second, per second, measured when the runway was wet as that obtained on an ordinary runway when equally wet. The actual figures were 6 before coating with the present anti-skid coating and 18 when the same space was treated and then flooded with water. As a comparable figure on a dry rubber covered runway, decelerometer readings taken with a James Decelerometer according to standard practice, was about 16 feet per second, per second. As will therefore be noted a runway treated in accordance with the present invention has a better non-skid characteristic when wet than the ordinarily used runway has when dry. The above can be shown not only by the deceleration rate but also by a close examination of the skid marks which are formed on a wet pavement treated by the present invention, the marks in this case being of a light color, whereas on an untreated pavement, the skid marks are dark, quite black. Close examination of the light colored marks shows no rubber visible. The light color is caused by the formation at the surface contact of a thin powdery film due to the displacement of very finely divided solid abrasive constituents of the compound. It appears that in each case the powdery surface thus displaced as the impact energy is absorbed by its formation is almost immediately rolled back into the pavement to form again an integral portion thereof, when subjected to rolling traffic and is then held by the runway. The economic savings by using the present invention is obvious when we compare the cost of the tires as against the cost of retreatment of the runway, particularly remembering that no replacement is needed with the present invetnion for a long period—of from one to three years.

The single figure of the drawing shows a vertical section through a runway embodying the present invention.

The usual hard surface of the runway is denoted 10 and may be of asphalt, concrete or any other of the usual materials. A used runway normally has a built-up layer of rubber, such as at 11. The invention includes treating the runway first with a thin coating of an inexpensive adhesive especially developed for the purpose this being 15 and at a slightly later time merely sufficient to enable the adhesive to become tacky, a second coat 17 is applied, this being a surface coat. It is possible to obtain a fairly satisfactory runway coating by using a hydrocarbon solvent such as xylene directly to the anti-skid coating 17 but while this produces a fairly adherent coating the length of time it remains tacky is a disadvantage and a pickup of the coating by the rolling tires is noticed.

The preferred adhesive coating 15 is formed by mixing together 400 gallons of an asphalt-water emulsion which should be SS–2 or equal, 1200 gallons of water and 15 gallons of xylene. The SS–2 emulsion is a mixture of 58% asphalt, 40% water, 2% flux with a penetrometer reading of from 50 to 60. The solvent should have an affinity for both the rubber normally found on the pavement and for the asphalt. The adhesiveness of this initial coating is so extreme that if one stands with his boots firmly on the tacky adhesive for even a few seconds it is quite possible to pull either foot from the boot. It is emphasized that without the xylene no such adhesiveness is attained.

The initial coating is applied quite simply by using a truck or other mobile tank which has a pump and an outlet nozzle. The asphalt emulsion is loaded in the tank and then the xylene is added and mixed, for example by pumping some five to ten minutes which completes under normal conditions a thorough mixing. The water is then added, and mixed again for 5 or 10 minutes. The mobile tank is then driven on the runway at a fairly high speed with the nozzle open, the speed being chosen so that a uniform coating of adhesive is applied at a rate of approximately 100 to 150 square feet per gallon as is usual with the application of coatings. It is most satisfactory to apply the coatings to one half of the runway, leaving the other half in condition for use so that the runway need not be shut down as is the case with some other applications.

The anti-skid coating which is applied as soon as the initial adhesive coating has become sufficiently tacky is now applied. This surface coating is a mixture in proper proportions combining asphalt emulsion, Portland cement and rosin.

The preferred proportions are—

5640 lbs. of minus 8 mesh plaster sand
198 gallons SS–2 asphalt emulsion
55 gallons water (variable)
36 lbs. of Portland cement
18 lbs. of powdered wood rosin.

The above may be stated equally in percentage by weight; i.e., sand, sharp grained, 72%; emulsion 21¼%;

water 6%; Portland cement ½%; rosin ¼%. The asphalt-water emulsion forms roughly one-fifth or 20% of the anti-skid compound, the sand forms roughly three-fourths or 75%, and the Portland cement and powdered rosin together form roughly one percent, all by weight. Water content is varied to give good squeegee properties.

It might be noted that the cement-rosin combination is an important ingredient as without this suspension member the sand or other solid materials would quickly settle out of the emulsion, whereas, with the cement and rosin present the sand or other solid fillers remain suspended for a long period of time as indicated by the fact that the mixing compound can be moved to a convenient place or packaged in drums if desired.

When the abrasive coating is mixed in the proportions stated the coating has a highly desirable thixotropic characteristic and this in turn is believed to add materially to the easy handling of the coating and the absence of a tendency of the sand to settle out. In addition, the rosin seems clearly to have a pronounced anti-skid characteristic of its own and the full combination minimizes or prevents pick-up or build-up of the tire rubber on the cured coating with a consequent extension of life of the tires.

In applying the final or surface coat to the runway the asphalt emulsion is first loaded in a transit truck with the mixer rotating, the solid ingredients are weighed, in adding, preferably using a batch weigher. Next sufficient water is added and the batch is then mixed until it has an appearance which indicates good squeegee spreading consistency. A suitable spreader box is then attached to the transit mixer truck which is pulled over the runway at a suitable uniform speed which would normally be somewhere between five and ten miles per hour. The squeegee at the outlet of the spreader box is adjusted to give a uniform coating of the desired thickness which may be as little as 1/16" thick but preferably is twice that much, that is, 1/8". The thoroughly mixed anti-skid compound passes from the squeegee of the spreader box as a thin adherent sheet forming a swath probably 10 feet wide at each single pass. It is quite preferable to feather the lapped edges of the coating in order to obtain a smooth uniform coating of the entire runway when the second application is made.

It has been found that an air temperature between 70° F. and 100° F. gives excellent results, but still better results are obtained if the air temperature is between 75° and 85° F. Low humidity is most desirable. The drying time for the final coating runs about three hours and the treated half of the runway may be used after about 24 hours from start of application so that the entire runway may be coated in a single day. The full runway may be put in operation within 48 hours of start of the treatment.

It is to be noted that my runway coating performs equally well on asphaltic concrete runways as on Portland cement concrete runways.

What I claim is:

1. The method of making safer a used runway for heavy jet aircraft having on the runway vulcanized rubber which has been removed from the tires of aircraft by landing impact, which consists of first applying to such runway an adhesive coating of an asphalt-water emulsion containing xylene at a rate of approximately 100 to 150 square feet per gallon and then when said coating has sufficient adhesiveness which it acquires on standing for a few seconds, applying over the adhesive coating a surface coating of a thixotropic mixture of plaster sand, asphalt emulsion, Portland cement, powdered wood rosin and water in about the following percentages by weight: sand 75%, emulsion 20%, cement and rosin together 1%, with water about 6% to give good spreading properties, that is, to provide a thin adhesive film.

2. The method of claim 1 in which the adhesive coating is made by thoroughly mixing xylene with the asphalt-water emulsion in the ratio of 15 gallons of xylene to 400 gallons of the emulsion; the percentages of the ingredients of the emulsion are roughly 58% asphalt, 40% water and 2% flux by weight, said water being thoroughly mixed with the other ingredients before application.

3. The method of claim 1 in which the anti-skid surface coating is applied at a temperature between 70° and 100° and consists of about 72% by weight of sharp-grained plaster sand; 21¼% asphalt-water emulsion, ½% of Portland cement and ¼% of powdered rosin and quite roughly 6% of water the latter varied to give good spreading properties to provide a thin adhesive film of about ⅛" thickness whereby the method increases the rate of deceleration of landing aircraft, thus minimizing the danger of skidding especially in wet weather.

4. A runway suitable as a landing strip for quickly decelerating heavy jet aircraft, comprising a runway hard surface having thereon vulcanized rubber which has been removed from the tires of aircraft by landing impact, an adhesive coating of xylene in an asphalt-water emulsion disposed on said runway and an anti-skid thixotropic surface coating disposed on said adhesive layer comprising approximately 20% asphalt-water emulsion by weight, approximately 75% sharp plaster sand by weight and approximately one percent of Portland cement and powdered rosin together by weight.

5. The runway of claim 4 in which the surface coating consists of ingredients in the following percentages by weight: sharp-grained minus 8 mesh plaster sand 72%; asphalt emulsion 21¼%; Portland cement ½%; powdered wood rosin ¼% with water of about 6% added to give good spreading properties.

6. The runway of claim 4 in which the adhesive coating consists of ingredients in the following proportions: 400 gallons of asphalt-water emulsion; 1200 gallons of water and 15 gallons of xylene; said emulsion being a mixture of 58% by weight of asphalt, having a penetrometer reading of between 50 and 60, 40% water and 2% flux by weight.

References Cited by the Examiner

UNITED STATES PATENTS

| 1,105,580 | 7/14 | Richardson | 94—9 X |
| 2,326,045 | 8/43 | McConnaughay | 94—23 |
| 2,861,004 | 11/58 | Sucetti | 94—23 |

FOREIGN PATENTS

| 723,634 | 1955 | Great Britain. |

OTHER REFERENCES

Asphalt and Allied Substances, by Abraham, pages 523, 568, 569, 646, 647, 658–680 incl., 870, 872 and 1171; vols. I and II, published in 1945 by Van Nostrand Co.

JACOB L. NACKENOFF, *Primary Examiner.*

WILLIAM I. MUSHAKE, *Examiner.*